March 27, 1962 J. O. EMMELKAMP 3,026,846
ANIMAL HOLDING FRAME
Filed June 2, 1959
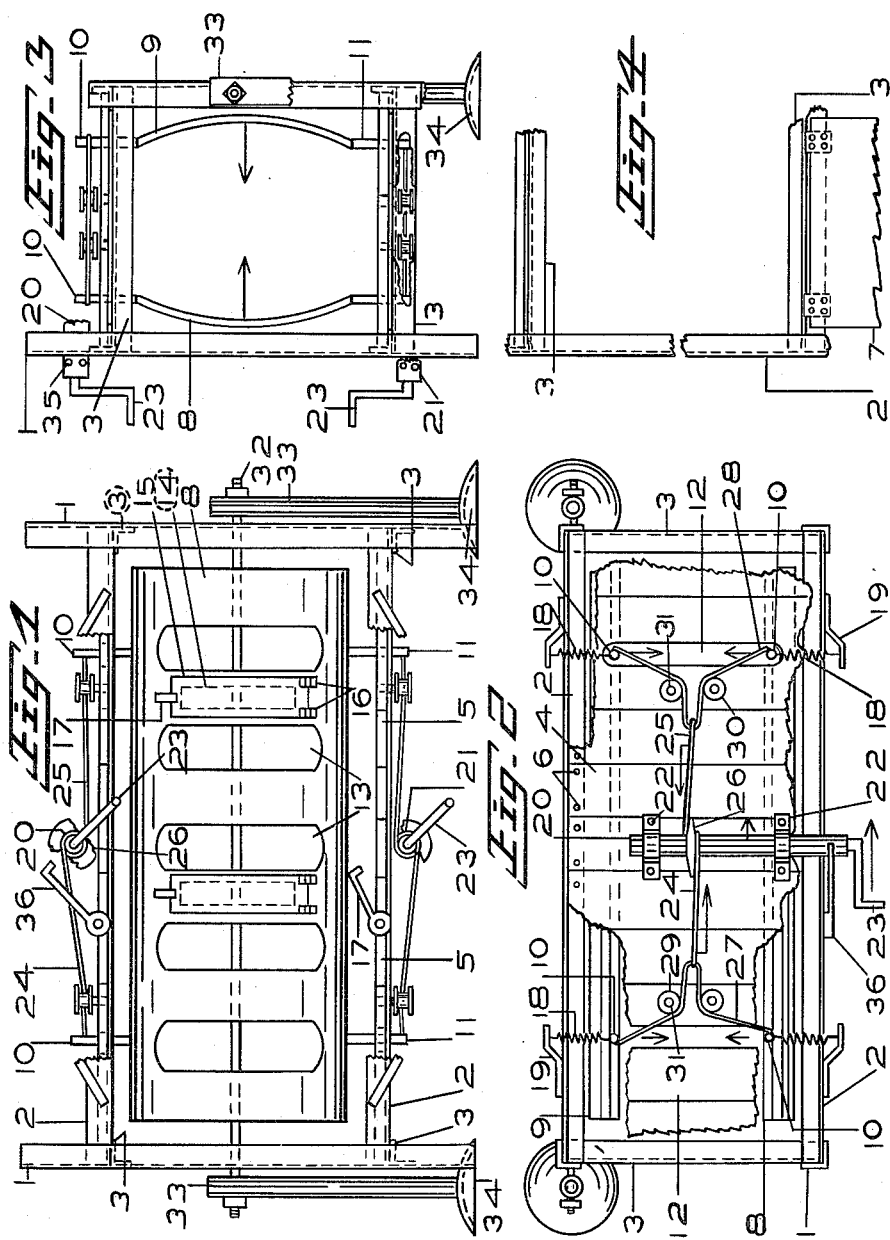

United States Patent Office 3,026,846
Patented Mar. 27, 1962

3,026,846
ANIMAL HOLDING FRAME
John Onno Emmelkamp, Nobleford, Alberta, Canada
Filed June 2, 1959, Ser. No. 817,598
2 Claims. (Cl. 119—103)

This invention relates to animal holders, having particular reference to a holder for sheep and hogs.

In operating on animals for various reasons, as for instance in castrating, a frame or box is desirable in which the animal can be held while it is being treated.

The present invention is designed to effect improvements in such holders, particularly holders for use with smaller animals, such as sheep and hogs. In this a frame is provided in which the animal is placed, and this frame carries a pair of movable side plates between which the animal is engaged to be held while being treated, these side or body plates providing openings for access to the animal and for viewing purposes. In addition it is possible to turn the frame upside down, which is particularly needed in using the frame for castrating.

In the drawings, illustrating a preferred embodiment of the invention,

FIG. 1 is a side view of the animal holder, shown with parts broken away.

FIG. 2 is a top plan view of the holder, shown with the upper planks broken away in part.

FIG. 3 is an end view of the holder, in part broken away and shown with the movable animal engaging body plates spaced apart in animal receiving position.

FIG. 4 shows a fragment of the holder frame, illustrating attachment of an end door, the latter being shown broken away.

The animal holder as herein disclosed provides a frame in which a pair of animal body engaging plates are mounted. This frame comprises four uprights 1 with upper and lower side and end bars 2 and 3, all of angle iron, and with the upper side and end bars spaced below the ends of the uprights, and the lower side and end bars spaced above the ends of the uprights, thus elevating the central area of the frame in which the animal is to be contained considerably above the ground, irrespective of whether the frame is in a normal upright position or upside down.

On the upper frame side bars are planks 4 attached by bolts or the like, and a similar set of planks 5 are attached on the lower frame side bars, similarly secured, the bolts for both sets of planks being indicated by the numeral 6.

The frame is designed to receive smaller animals, such as sheep or hogs, the one end of the frame being closed by a door 7 hinged to a top frame end bar, as shown in FIGURE 4.

To engage an animal within the frame and hold it firmly while it is being treated a pair of body plates 8 and 9 are provided supported by top and bottom pins 10 and 11 slidable in slots, as at 12, in the upper and lower planks 4 and 5, by which the body plates may be moved laterally to and away from an animal in the frame. To more effectively engage the animal these plates are shown concavely moulded on the inner sides, conforming generally to the body shape of the animal.

The body plates 8 and 9 include working openings 13 on each side to provide access to the animal, and in addition viewing openings 14 covered by plates 15 hinged at 16 to the body plates and secured by catch members 17.

The body plates 8 and 9 are normally held spaced apart by springs 18 attached to brackets 19 on the upper and lower frame side bars and engaging the body pins 10 and 11. For moving the body plates inward to engage the animal upper and lower rollers 20 and 21 are provided mounted to turn in brackets, such as the brackets 22, and including crank handles 23. To each of these rollers are attached cables oppositely wound on the rollers separated by plates 26. The cables are made up of end portions 24 and 25 engaging looped portions 27 and 28 trained over spools 29 and 30 mounted on pins 31 fixed in the planks, the looped cables attaching to the body pins 10 and 11. By turning the rollers 20 and 21 simultaneously by the handles 23 the body plates may be moved together into engaging relation to an animal in the frame, it being understood similar cables are provided for each roller. The body plates are moved back to their normal open position by the springs 18.

For turning the animal upside down, as required for some operations, the frame is suspended on a rod 32 extending through the uprights 1 on one side and mounted to turn in standards 33 on feet 34, the frame resting supported at ground level in either an upright or upside down position.

In the use of the device an animal to be treated is driven into the holding frame and the plates 8 and 9 are moved by turning the crank handles 23 to engage the animal between the body plates. When the animal is firmly held catch members 17 and 36 pivoted on the frame side may be engaged in notches 35 in the rollers 20 and 21, FIGURE 3. The frame then can be turned upside down, as required, pivoting on the standards 33.

I claim:

1. In an animal holding device having a rectangular frame structure and animal engaging means mounted to be movable into engaging and disengaging position relative to an animal to be treated in the frame, said animal engaging means comprising body plates extending the length of an animal to be engaged thereby and shaped concavely on their inner sides conforming generally to the contour of the sides of an animal to be treated, said plates having working openings at intervals.

2. In an animal holding device as set out in claim 1, said device having a rectangular frame that includes uprights connected by upper and lower side and end bars; means mounting the frame to be inverted, said means comprising a pair of standards, said standards including means adapting the standards to stand upright, a rod extending through the standards and horizontally lengthwise of the frame through a pair of uprights, said uprights having their end portions extending above and below the side and end bars of the frame forming feet on which the frame is supported in its upright positions.

References Cited in the file of this patent
UNITED STATES PATENTS

| | | |
|---|---|---|
| 1,444,711 | Sherwood et al. | Feb. 6, 1923 |
| 2,183,470 | Speckels | Dec. 12, 1939 |
| 2,408,872 | Newbold | Oct. 8, 1946 |
| 2,523,459 | Wells | Sept. 26, 1950 |
| 2,616,392 | Hutchings | Nov. 4, 1952 |
| 2,851,993 | Hettinger | Sept. 16, 1958 |